July 19, 1955 A. V. HEMMER 2,713,195
METHOD OF MAKING AN ENGINE MANIFOLD
Filed March 15, 1951 2 Sheets-Sheet 1
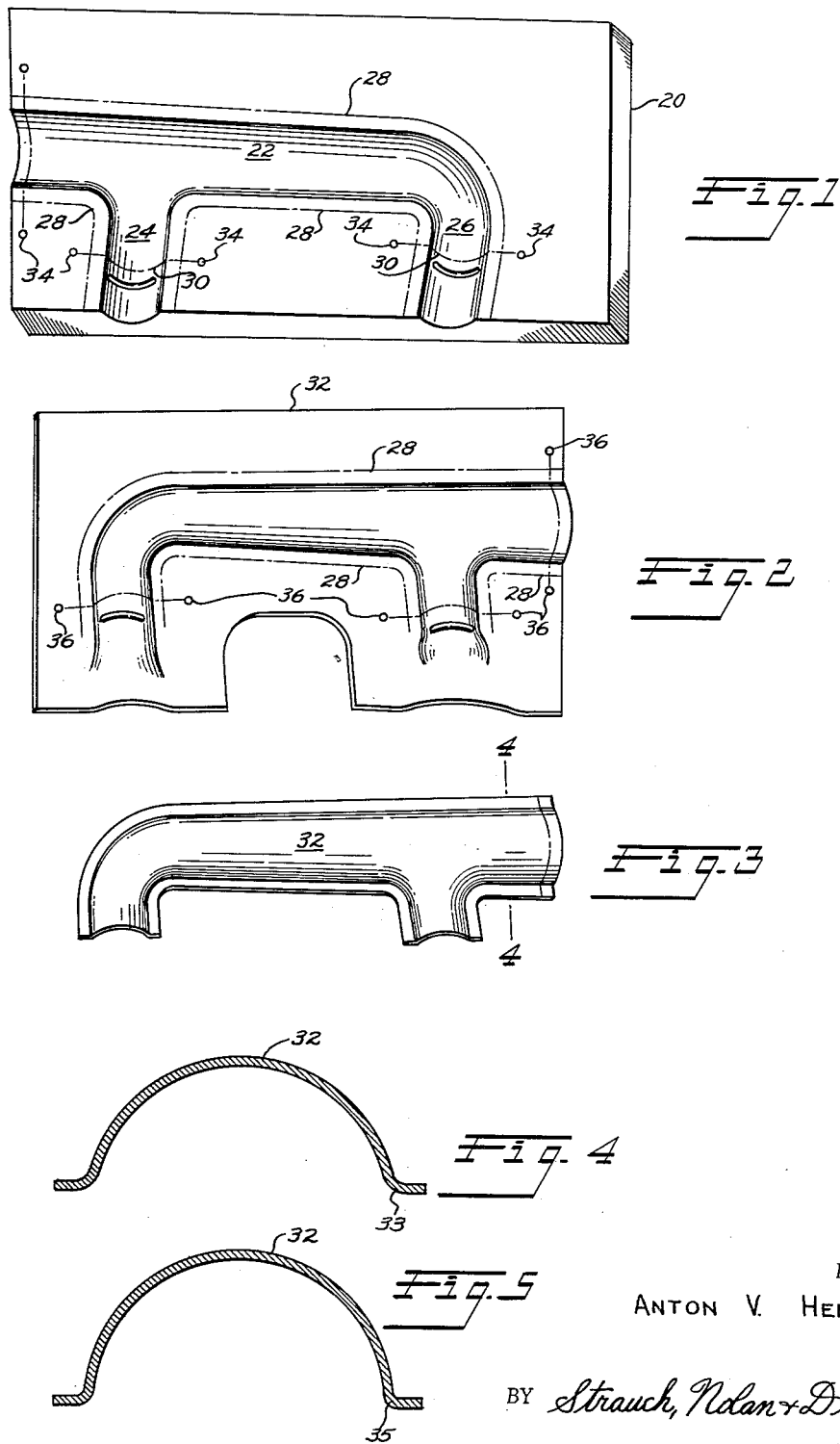
INVENTOR
ANTON V. HEMMER
BY Strauch, Nolan + Diggins
ATTORNEYS

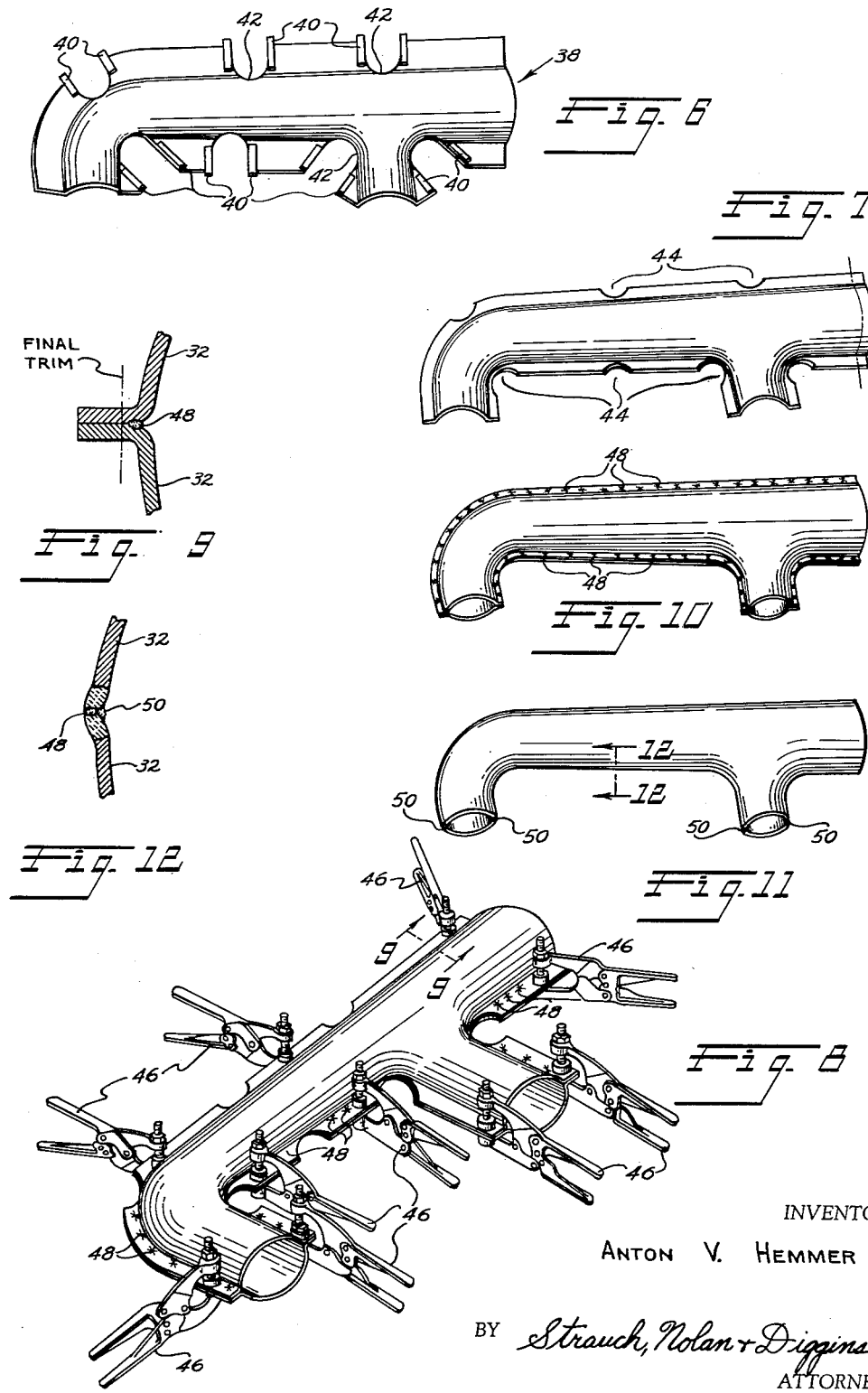

United States Patent Office 2,713,195
Patented July 19, 1955

2,713,195

METHOD OF MAKING AN ENGINE MANIFOLD

Anton V. Hemmer, Lemon Grove, Calif., assignor to Solar Aircraft Company, San Diego, Calif., a corporation of California Application March 15, 1951, Serial No. 215,833

3 Claims. (Cl. 29—157)

This invention relates to metal fabrication methods and more particularly to methods for fabricating ducts from semi-tubular sheet metal stampings.

The method of the present invention will be described in its preferred embodiment with reference to the fabrication of light weight ducts particularly suited for intake and exhaust structures for aircraft and other internal combustion engines, although it will be understood that the method may be of general application in duct fabrication.

It is of primary importance in aircraft that ducting of this kind be light enough to lie within the rigidly enforced weight maximums and at the same time provide a gas-tight structure capable of withstanding the adverse effects of high temperature, corrosive gases and vibrating stresses invariably encountered in internal combustion engines, preferably for the life of the aircraft or at least the life of the engine.

Failure of an exhaust manifold presents a serious fire hazard and may result in damage or destruction of equipment and injury to personnel. Consequently strength and durability are prime requisites of manifolds of this type.

It has been found that the life of ducting fabricated from two welded half-stampings depends in large measure on the degree to which uniform thickness of the metal is maintained in the finished duct around its periphery and particularly through the weld section, and the invention accomplishes this desirable structure as will appear.

Prior to the invention, the usual method of welding together duct half-sections produced a large and thick weld along each juncture of the two halves which was particularly objectionable in welded semi-tubular stampings that tend to thin to less than their original sheet metal thickness immediately adjacent the welds when subjected to heat and vibration. An abrupt change in cross-sectional area such as is produced where relatively thin metal stampings are joined by a thick weld produces a discontinuity which acts to increase stresses under conditions of stress and vibration. This effect is aggravated in exhaust manifolds where the tubular section operates at high temperatures while being subjected to vibratory stresses and hot corrosive exhaust gases. The thin portions immediately adjacent the weld heat more rapidly and remain hotter during operation than the thick weld portions. The thick weld portions retain heat longer than the thin portions. This not only produces undesirable stress concentrations when the manifold is new, but also accelerates failure of the structure as its life increases because the thin portions, being hotter, are subject to more rapid corrosion and resultant thinning, and the disparity between the thin and thick portions proportionately increases with accelerated stress raising characteristics and the differential temperature stresses mentioned previously. Frequently this has been the cause of so-called "hot spots" and premature failure.

Numerous expedients have been employed to lessen the differential thickness between the weld and the adjacent duct metal. For example in making engine manifolds, seam pounding, a manual operation in which the welded manifold having the thick weld junctions is placed over a suitably curved mandrel and beaten with a lead or kirksite-headed mallet along the junctions to thin them to approximately the same thickness as the duct metal has been employed. However, this process, besides not producing uniform results, is an expensive and time consuming operation which substantially increases the cost of the finished product.

Although some progress has been made in the maintenance of full or nearly full metal thickness through the corner of the welded junctions in such manifolds as may be seen by reference to U. S. Patents 2,383,706; 2,492,131; and 2,495,504, the radii at the flash corners have in general been substantially greater than the metal thickness with the result that no parent metal remains within the perimeter of the final tube when the two half stampings are brought into alignment. This necessitates a heavy expensive weld at the flash corner with the attendant disadvantages set forth above.

An illustration of present day prior art methods is disclosed in U. S. Letters Patent 2,329,938 in which semi-tubular sheet metal stampings having intact flash flanges of indeterminate and indefinite width are clamped together, spot welded along the flange at points about six inches apart to hold the stampings after removal of the clamps, spot welded close to the duct after removal of the clamps, trimmed to reduce the flanges to uniform width of about one-eighth of an inch, and finally welded along each seam to reduce the flanges to thick weld junctions. A serious disadvantage in this method arises from the fact that the corners of the mating flanges are not in contact along the internal peripheral line of the final duct. Thus the space between the mating portions of the flash corners must be filled with new weld metal or the parent metal heated to a semi-fluid state to bridge the gap. Further, the trimming to uniform flange width must be done sufficiently far out on the flange flash surfaces so that the parent metal is in actual contact. Despite all efforts to the contrary, this results in a weld substantially thicker than the adjacent parent metal with the attendant disadvantages mentioned above.

Besides these difficulties, the flash flanges of indefinite width disclosed in U. S. Patent 2,329,938 may prevent perfect seating of the flash corners along the entire length of the aligned semi-tubular stampings and prevent the spaced spot welds from securing perfect fit along the tube. The preferred close trimming adjacent the flash corner might then actually penetrate the corners beyond the point of metal to metal contact of the stampings. This at once opens up a hole which requires a careful inspection and subsequent filling with metal in the final welding, an expensive, time-consuming operation and frequent use of "doublers" or patches, which further add to thickness disparity and differential expansions. Such discontinuities make for slow welding, heating of the area close to the wall, localized stresses and warping of the final assembly.

In the improved method of the present invention, metal to metal contact of the stampings is assured at the flash corner virtually within the perimeter of the final parts. Provision is also made in the present invention to assure planar alignment of the flash corners during the preliminary trimming and welding. Further, a preliminary trim to obtain uniform flash flange widths of approximately one-half inch is made to allow visual inspection of the seating of the stamping halves as they are clamped together prior to spot tacking. Any discrepancies in the mating engagement of the flash flanges can then be corrected prior to spot tacking. The final trim, generally within one-eighth of an inch of the final periphery of the finished duct, still falls outside the metal-to-metal contact area of the two flash corners. The resulting tight seam makes possible rapid and efficient welding either by shielded arc, atomic hydrogen, or gas welding. Patch welding, which is invariably necessary in the prior art and creates weld stresses and warpage, is eliminated in the present invention.

Accordingly, it is an important object of the invention to provide a novel method for the fabrication of tubular ducts which will produce a seam not appreciably thicker than the surrounding metal and thus virtually eliminate stress discontinuity.

It is a further object of the invention to provide an improved method of welding a plurality of mated parti-tubular sections which comprises utilization of alignment notches that are positively positioned by an overriding template for aligning corresponding notches of mated parts clamped in their aligned position for spot welding.

It is also an object of the present invention to provide a novel method for the fabrication of tubular ducts which includes a peening operation for sharpening the flash flange corners to radii generally less than the thickness of the material to permit spot welding of the flanges closer to the duct than heretofore possible and providing for retention of a large portion of the spot weld in the finished duct.

It is an additional object of the invention to provide a novel method for the fabrication of tubular ducts which virtually eliminates patch welding through sharpening of flash flange corners and preliminary trimming to provide adequate metal-to-metal contact of uniform flash flanges as well as visual inspection of such contact to assure a perfect fit.

It is also an important object of the invention to provide a novel method for the fabrication of tubular ducts which have improved resistance to corrosion and mechanical stress and an extended useful life, at substantially reduced expense.

Further objects and advantages will become apparent as the description proceeds in connection with the accompanying drawings in which:

Figure 1 is a generally perspective view of a die used in forming a typical metal half-stamping for an engine manifold to which the method of the present invention may be applied;

Figure 2 is a perspective view of the untrimmed half-stamping made using the die of Figure 1;

Figure 3 is a perspective view of the half-stamping of Figure 2 after trimming the flash flange to a predetermined uniform width;

Figure 4 is an enlarged fragmentary sectional view of the stamping on line 4—4 of Figure 3;

Figure 5 is a similar view illustrating the sharpened flange-to-body corner after the edge peening operation of the invention;

Figure 6 is a perspective view of a template for locating alignment notches in the stamping;

Figure 7 is a perspective view of the stamping showing the alignment notches made in the flash flange according to the next operation;

Figure 8 is a perspective view of a pair of the notched half-stampings of Figure 7 clamped together and partially spot welded;

Figure 9 is a fragmentary sectional view of the assembled stampings on line 9—9 of Figure 8 prior to final trim;

Figure 10 is a perspective view of the assembled spot welded manifold after the final trimming or nibbling of the flanges;

Figure 11 is a perspective view of the finished manifold duct after final welding; and Figure 12 is a fragmentary sectional view through the weld line of the finished manifold duct on line 12—12 of Figure 11.

Referring now more particularly to the drawings, 20 indicates a die for forming a typical half-stamping. The die comprises a semi-circular recessed portion 22 having extensions 24 and 26 which correspond, respectively, to the main conduit section and legs leading to intake or exhaust ports in an internal combustion engine in the finished part.

The recessed portions join the flat surface of the die in a curved corner. Trim lines and cut off lines 28 and 30, respectively, are provided in the dies which are of sufficient depth to appear in the stamping 32 (Figure 2) with sufficient clarity to guide the operator in subsequent trimming operations.

In making the dies and their patterns, particular care must be taken to provide smooth and well fitting surfaces immediately adjacent the corners joining the recessed portions and the flat surfaces. Since the surface beyond the trim lines is removed prior to assembling the mating half-stampings, the dies need not be accurately finished beyond the trim lines as is necessary in prior art methods where the untrimmed parts are assembled. Substantial economies are thus effected in pattern and die manufacture by the reduction of critical finished areas.

At spaced points on the surface of the die beyond the curved portion of the trim line, small circular bosses 34 and 36 are formed which may be identified by the letters c o indicating "cut off" or final trim line. The indentations made in the stampings by these projections guide the operator in the subsequent rough trimming operation along the indicated phantom lines in Figure 2. These indentations may also serve as reference points for alignment of the parts in the event that staging is necessary in the stamping operation.

After the rough stamping 32 is formed to the shape shown in Figure 2, it is trimmed along the lines 28 which are preferably spaced approximately one-half inch from the bend line in a typical intake or exhaust conduit. The port legs are trimmed along the lines 30 to length approximately three-eighths inch greater than the length of the finished part. The rough trimmed stamping is shown in Figure 3.

As will be seen by reference to Figure 4, the flash flanges join the central portion of the stamping in a comparatively large radius corner 33 which must be reduced appreciably prior to assembly and welding. This reduction in the radius of curvature of the flash flange corners is effected by progressive passage of the part through a V-headed peening hammer, or, where the curvature in the plane of the flanges permits, buffalo rolls of similar V contour may be used.

It is contemplated that the peening operation will reduce the bend radii at the corners 35 to a value less than the metal thickness as shown in Figure 5. In some cases the peening operation may be carried to the point where the metal is practically coined to produce a substantially square corner.

After the peening operation, a template 38 (Figure 6) is placed over the stamping 32 and clamped in position with guide bars 40, which are provided on the edges of slots 42, supporting the stamping 32 over the female die of a conventional circular hole punching machine. Thus supported, the stamping is struck by the male punching die from the flange side to produce the alignment notches 44 (Figure 7). This arrangement minimizes or eliminates entirely the distortion of the flange which would otherwise interfere with the close contact of the flanges when assembled. However, if necessary, the stamping may be restruck after removal of the template to remove any distortion which may have been produced by the peening or trimming operations. The trimmed and peened stampings, which are completely free from distortion, are then ready for assembly.

The mating half-stampings are placed in their assembled relation with the flanges in contact and visually or manually aligned by reference to the alignment notches 44. With the mating sections manually held in alignment, they are progressively clamped in their aligned position with suitable clamps or pliers which are preferably of the self-locking type known as Knu-lok pliers. As will be seen by reference to Figure 8, each of the flange portions separated by the alignment notches is preferably individually clamped. Positive alignment of the stampings may also be obtained by the use of small holes in the flanges supplementing or replacing the notches 44 which may be automatically aligned by dowel pins or bullet headed pliers. It is to be noted that in addition to serving as reference points by which the half-stampings may be visually aligned, the notches 44 also provide entering points for the tools both in the preliminary and final trim and facilitate convenient cut-off of the trimmed portions into relative small pieces. Also at sharp bends in the stamping, the alignment notches may serve as the final trim, considerably facilitating the final trimming operations.

Because of the reduced definite width of the flash flanges and the fact that the flanges were punched with a minimum of distortion which was corrected in the final restriking operation, the flanges will be in metal-to-metal contact substantially along their entire mating line, a condition which is extremely difficult or even impossible to achieve when the parts are joined before trimming of wide rough flanges. Further because of the sharp radii at the bend line produced by the peening operation, the area of contact will extend inwardly of the outer peripheral line of the finished duct. Should any slight opening appear on the mating line of the flanges it may be readily closed by the addition of further clamps before the spot tacking operation has begun.

With the sections thus aligned and clamped, they are spot welded as close to the bend line as possible as at 48. It will be noted that the tack welding may be accomplished with conventional equipment without the use of fixtures, which in the past have accounted for as much as one third of the total tooling cost in the manufacture of manifolds. The tack welds are preferably made with offset oval electrodes so that the area of the welds may be relatively great and at the same time lie close to the bend line. Ordinarily, the tack welds will be spaced at three-eighths inch intervals along the flash flanges. The clamps may be progressively removed as the welding proceeds or they may be retained until the spot tacking is substantially complete.

The flanges of the joined halves are then scribed and sawed to within one-eighth inch of the final periphery of the finished duct as shown in Figure 10. The final cut off line is indicated in Figure 9. The inner notches 44 preferably have their inner peripheries coincident with the final trim line so that no non-straight line sawing is needed there and no further nibbling or sawing is needed at the inner corners of the assembly. It has been found that sawing is preferable to a nibbling operation for the final trim because of the tendency of the nibbler to distort the flanges.

As may be seen from Figure 9, the sharpened flash corners tend to draw at least a portion of the spot weld nodule within the perimeter of a final part and a very large portion of it within the closest possible flash trim. It is to be noted that the final trim, which, as stated, is preferably within one-eighth inch of the final periphery, falls outside of metal-to-metal contact area of the two flash corners.

The part may then be completed by welding the seam by a shielded arc gas process, by acetylene, gas welding, or other conventional process. Because of the substantial metal-to-metal contact along the entire seam after the final trimming operation, it has been found that the final welding process can be rapidly and efficiently accomplished with a reduction in time amounting to as much as forty percent. It has been found that by leaving approximately one-eighth inch of flange at the final trim the right amount of metal is provided to effect a strong smooth weld. The flange is melted until it is substantially flat and puddled during welding, leaving a smooth even surface free from holes which must be patched. Any roughness or other variation from a smooth surface may be removed by seam pounding whenever necessary. However, since distortion of the duct is minimized at all stages of manufacture, it has been found that the use of this laborious, slow process of seam pounding has been substantially eliminated. In the very worst conditions it is still less than fifty percent of that common in the best prior methods. In fact, the welding process will in most cases provide a final smooth contour.

The finished duct is illustrated in Figures 11 and 12. It will be seen that the larger portion of spot weld 48 remains in the finished part and that the seam has a smooth weld 50 of substantially uniform thickness which is substantially that of the circular wall of the duct.

The part is completed by trimming the legs of the duct to the desired finished length. It has been found to be desirable to defer the final trimming of the duct leg until this stage of the fabrication so that any shortening of the duct leg because of clamping, welding, etc., will not effect the final length of the duct leg.

As stated above the use of "doublers" or patch welding is virtually eliminated in the present process. It has also been found that pin hole repair is reduced approximately 50 percent over the best prior method. Since both of these operations are slow and require highly skilled technicians, the reduction in manufacturing costs effected by their elimination will be immediately apparent.

Further the elimination or minimization of these operations reduces the residual stresses and discontinuity in the finished duct and consequently effects a substantial improvement of the performance characteristics and service life of the finished product.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a method of fabricating a manifold, the steps of providing two half stampings of sheet metal having flash flanges projecting from their edges and connected to the main stampings by corners, trimming said flash flanges to substantially the same finite width and mechanically working said stampings to produce shorter internal radii at said corners, forming alignment indicia in said trimmed flanges, clamping said half stampings with said flanges in contact and said indicia in registry and said corners aligned, welding the associated flanges together at spaced points, trimming said flanges close to the stampings, and then seam welding and melting the trimmed flanges along their length to join said stampings with smooth seams of substantially uniform thickness which is substantially that of the parent metal.

2. In a method of fabricating a tubular duct from a plurality of mating semi-tubular sections having flash flanges joined to a semi-tubular body in rounded corners, the steps of reducing the flanges to a predetermined width, decreasing the radius of said corners, providing alignment indicia on said flanges, assembling the sections with the flanges in contact and the alignment indicia in register, welding the assembled sections together, reducing the width of said flanges, and welding and melting said trimmed flanges to form seams along the mating lines of the sections substantially flush with outer surface of said sections.

3. In a method of fabricating an engine manifold, the steps of providing two half stampings of sheet metal having flash flanges projecting from their edges and connected to the main stampings by corners, trimming said flash flanges to substantially the same finite width, mechanically working said stampings to produce shorter internal radii at said corners, forming alignment recesses in said trimmed flanges, clamping said half stampings with the terminal flanges in contact, said recesses in registry and said corners aligned, welding the associated flanges together at spaced points, trimming said flanges close to said stampings along the line which coincides with the deepest portion of said recesses, and then seam welding and melting the trimmed flanges along their length to join said stampings with smooth seams of substantially uniform thickness which is substantially that of the parent metal.

References Cited in the file of this patent

UNITED STATES PATENTS

| | | |
|---|---|---|
| 165,302 | Butler | July 6, 1875 |
| 1,281,883 | Toof | Oct. 15, 1918 |
| 1,678,744 | Olsen | July 31, 1928 |
| 2,108,209 | Reilly | Feb. 15, 1938 |
| 2,329,938 | Ortiz | Sept. 21, 1943 |